United States Patent [19]

Perlin

[11] Patent Number: 4,678,902
[45] Date of Patent: Jul. 7, 1987

[54] FIBER OPTIC TRANSDUCERS WITH IMPROVED SENSITIVITY

[75] Inventor: Alfred R. Perlin, Highland Park, Ill.

[73] Assignee: Metatech Corporation, Northbrook, Ill.

[21] Appl. No.: 729,155

[22] Filed: Apr. 30, 1985

[51] Int. Cl.⁴ .............................................. H01J 5/16
[52] U.S. Cl. ............................... 250/227; 250/231 P; 73/705
[58] Field of Search ................. 250/216, 229, 231 R, 250/231 P, 227; 73/655, 657, 800, 705, DIG. 11; 356/32

[56] References Cited

U.S. PATENT DOCUMENTS

| | | | |
|---|---|---|---|
| 3,394,976 | 7/1968 | Hawkins | 250/227 |
| 3,789,667 | 2/1974 | Porter et al. | 73/705 |
| 3,789,674 | 2/1974 | Anderson et al. | 250/231 R X |
| 3,961,185 | 6/1976 | Brokenshire et al. | 250/227 X |
| 4,071,753 | 1/1978 | Fulenwider et al. | 250/227 |
| 4,581,528 | 4/1986 | Brogardh et al. | 250/227 |
| 4,596,925 | 6/1986 | Gilby | 250/227 |

*Primary Examiner*—Eugene R. LaRoche
*Assistant Examiner*—David Mis

[57] ABSTRACT

Fiber optic transducers are constructed from a single optical fiber wherein the geometry of the fiber is altered such as by introducing a bend or curve area in the fiber adjacent to the exit end of the fiber or by forming a canted or angled reflective surface at the exit end of the fiber. The alteration in the geometry of the fiber at or adjacent to the exit end thereof causes the light exiting from the fiber to project therefrom in a modified or expanded cone enabling more sensitive measurement capabilities.

7 Claims, 7 Drawing Figures

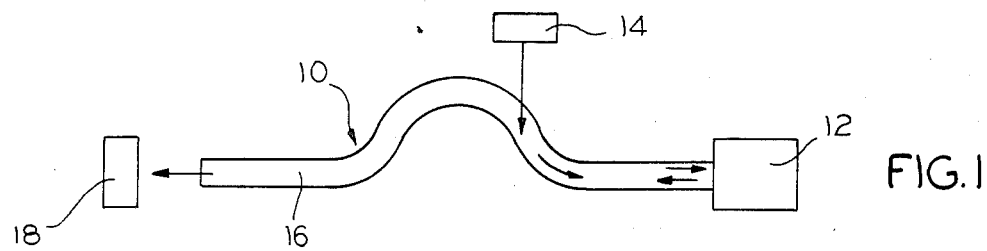
FIG. 1
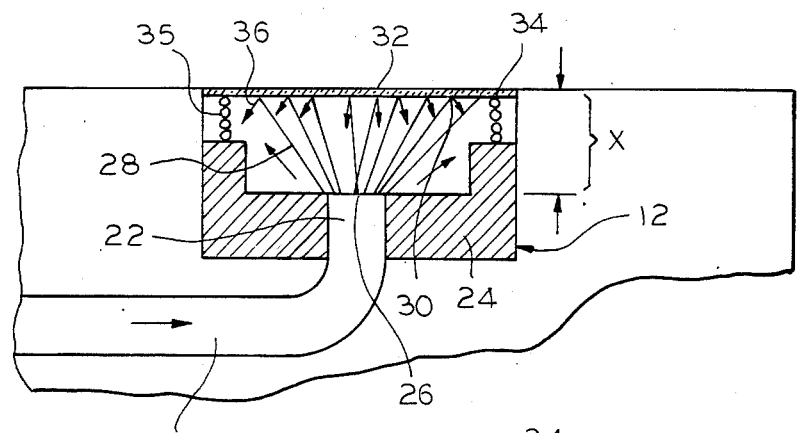
FIG. 2
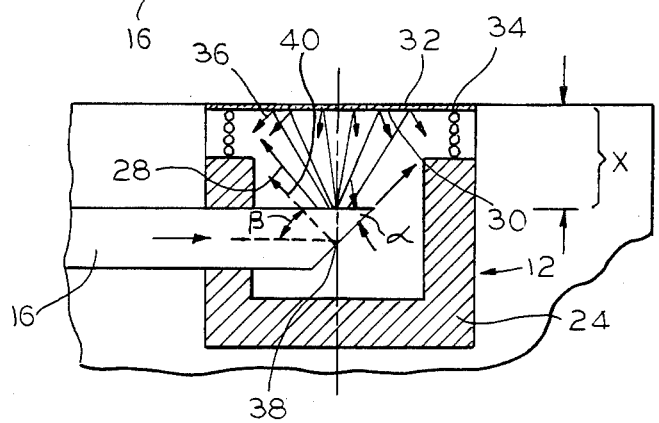
FIG. 3
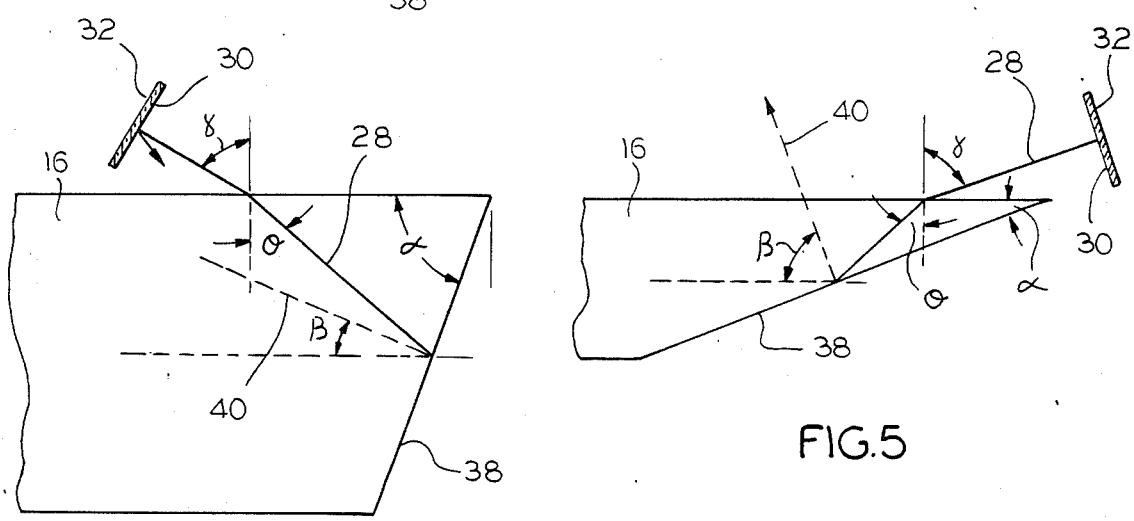
FIG. 4
FIG. 5

FIBER OPTIC TRANSDUCERS WITH IMPROVED SENSITIVITY

BACKGROUND OF THE INVENTION

The present invention relates generally to fiber optic transducers and, more particularly, to single fiber displacement transducers suitable for detecting linear and rotational movement of a deformable reflective surface.

An example of the state of the technology up to the point of this invention is taught in the J. H. Porter et al U.S. Pat. No. 4,071,753. The fiber optic transducers taught in the Porter patent consist of separate input and output optical fibers. The output fiber is optically positioned relative to the input fiber so that a predetermined portion of the optical power carried by the input fiber is coupled into the output fiber and the modulated optical power received by the output fiber is carried away from the transducer through the output fiber.

Other examples of multi-fiber optic transducers are taught in U.S. Pat. Nos. 3,394,976; 3,789,667; 3,789,674 and 3,961,185. Each of such transducers operate on the same general principle as those taught in the 4,071,753 patent wherein light is introduced through an input fiber and is reflected off of a movable or deformable reflective surface to produce a modulated beam of light which is coupled into an output fiber through which the modulated light is carried away from the transducer to a detector.

The problem with these prior art devices is that they do not provide the requisite sensitivity in detection of displacement of the reflective surface under certain conditions and, since they are multi-fiber arrangements, they are not suited for the production of micro-miniaturized assemblies. Therefore, it has been an object of on-going investigation to develop single fiber optical transducers which would provide enhanced sensitivity for detecting minor deflections or movements of a movable or deformable reflective surface but are readily adaptable to micro-miniaturized constructions.

However, in prior single fiber assemblies, it has been standard to align the fiber axially with its face perpendicular to the axis of the fiber and essentially parallel to the movable or deformable surface. With such assemblies, a cone of light symmetric with the axis of the fiber is projected from the fiber onto the reflective surface and a cone symmetric with the axis is reflected back toward the fiber face where a fraction of the returning light reenters the fiber for transmission back through the fiber. The sensitivity of these assemblies to displacement or deflection of the reflective surface (i.e., the change in the intensity of light reentering the fiber as a function of a change in the distance of the reflective surface from the fiber face as the surface moves) has been found to be acceptable when the initial distance of the fiber face from the reflective surface is relatively short (i.e., up to about 50% of the diameter of a fiber having a numerical aperture of about 0.5). However, at greater distances, the sensitivity to deviation in distance of the reflective surface from the fiber face is not adequate for practical use.

Thus, it is an object of the present invention to provide single fiber optical displacement transducers which have the requisite sensitivity to changes in distance of the reflective surface from the fiber face over a relatively broad range of distances and are amenable to fabrication in micro-miniaturized assemblies.

It is another object of this invention to provide single fiber transducers exhibiting a sensitivity curve such that any small movement of the reflective surface relative to the face of the fiber will result in a significant change in the intensity of reflected light reentering the fiber.

It is a further object of this invention to provide single fiber optical transducers which may be used to sense linear and/or angular displacement caused by changes in pressure, force, torque, acceleration, temperature, electric or magnetic fields applied to a reflective surface.

It is a still further object of this invention to provide single fiber optical transducers which are simple in construction and which may be utilized in a wide variety of potential applications.

SUMMARY OF THE INVENTION

In accordance with the above objects, the invention is accomplished by a transducer constructed from a single optical fiber or waveguide. The fiber or waveguide may be a single-mode or multimode fiber. At or adjacent to the end of this fiber, the geometry of the fiber is altered in a manner such that light exiting from the fiber projects onto a movable or deformable reflective surface in an expanded cone. A preferred means for achieving this expanded cone of projected light is to introduce a bend or curve area in the fiber adjacent its exit end. Another preferred means is to form a canted or angled reflective surface on the exit end face of the fiber.

The advantage of this construction is that the expanded cone of light will be projected onto the reflective surface from the end face of the fiber and will be reflected off of this reflective surface back toward the fiber as a further expanded cone. A portion of this reflected cone of light will reenter the fiber and be transmitted back through the fiber with the intensity of light reentering being mainly dependent on the ratio of the area of the face or surface of the fiber which will receive the reentering light to the area of the cone of reflected light in the plane defined by the receiving face or surface of the fiber. Thus, since the area of the face or surface of the fiber is constant, the sensitivity of the system will be largely dependent on the variance in the area of the cone of reflected light and in view of the expansion of this cone provided herein, sensitivity to displacement of the reflective surface will be enhanced and more sensitive displacement sensing will be accomplished in accordance with the present invention.

The foregoing and other objects, features and advantages of this invention will be apparent from the following detailed description of the preferred embodiments taken together with the accompanying drawings.

BRIEF DESCRIPTION OF THE DRAWINGS

FIG. 1 is a schematic diagram of a fiber optic assembly employing an optical transducer in accordance with the present invention;

FIG. 2 is a partially schematic diagram of one embodiment of an optical transducer according to the present invention;

FIG. 3 is a partially schematic diagram of another embodiment of an optical transducer according to this invention;

FIG. 4 is a detailed enlargement of the light path in a further embodiment of the optical transducer of FIG. 3;

FIG. 5 is a detailed enlargement of the light path in a still further embodiment of the optical transducer of FIG. 3;

DESCRIPTION OF THE PREFERRED EMBODIMENTS

Figure 6:
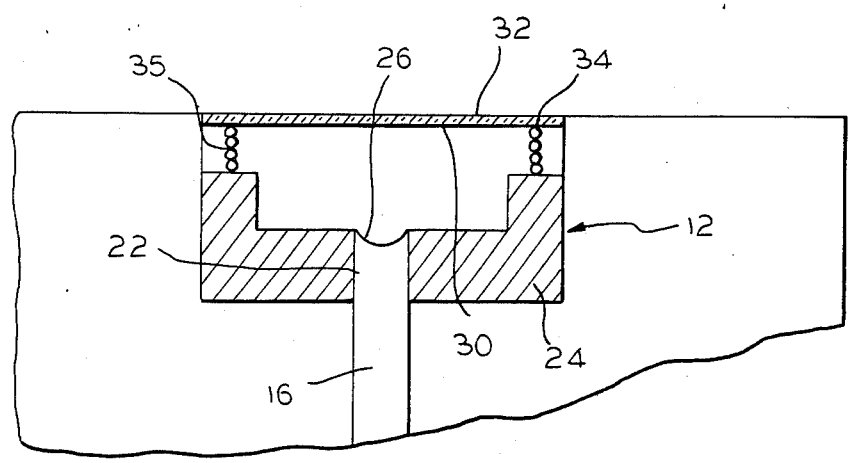
FIG. 6 is a partially schematic diagram of another embodiment of an optical transducer according to the present invention wherein the end face of the fiber is formed in a concave shape.

A description of the invention follows referring to the drawings in which like reference numerals denote like elements of structure in each of the several figures. In general, the terms "optical fiber" or "optical waveguide" will be used herein to refer to a glass or plastic transmission line having a core member with cladding members concentrically surrounding the core for transmission by internal reflection at the core-cladding interface of electromagnetic radiation which lies in the optical portion of the electromagnetic spectrum between microwaves and X-rays including the ultra-violet, visible and infra-red regions.

Reference is now made to FIG. 1 of the drawings which shows a fiber optic assembly referred to generally by the reference numeral 10 in which an optical transducer 12 according to the present invention is employed. The optical transducer 12 is completely optical in nature and employs no electrical connections or signals therein. The assembly 10 operates on the principle of producing an output optical signal whose amplitude is proportional to the input information variation with an optical fiber being utilized to convey the output optical power variation from the transducer 12 to a suitable destination.

A light source 14 such as an incandescent lamp, a laser or a fiber optic illuminator emits a beam of light which is coupled into a glass or plastic optical fiber or optical waveguide 16, preferably employing a fiber optic coupling assembly as described in my copending U.S. patent application, Ser. No. 506,839. The light is then transmitted in a forward direction through the core of the fiber 16 to the transducer where the light is projected out of the fiber 16 at its exit end onto a reflective surface (such as a movable or deformable mirrored surface) the displacement of which is to be measured. Contemplative measurements which can be made relative to the displacement of the reflective surface are linear or angular displacements caused by variances in pressure, force, torque, temperature, acceleration, magnetic fields or electric fields acting on the reflective surface and inherent curvature measurements of the surface itself.

Of the light exiting fiber 16 which is reflected off of the reflective surface, only a small amount will actually reenter the core of the fiber 16 via transducer 12. The reentering light is then transmitted in the reverse direction through the fiber 16 to the initial transmission end of the fiber 16 where the returning light which constitutes a modulated optical information wave or light signal is collected by a photodector 18 such as a photodiode for measurement of its intensity and comparison with a reference light signal.

Referring now to FIG. 2, there is shown a preferred embodiment of the optical transducers (identified generally by reference numeral 12) according to the present invention which can be utilized in a variety of assemblies such as the system shown in FIG. 1. In this embodiment, depicting the transducer 12 utilized as a displacement transducer, the exit end 22 of fiber 16 is supported and fixed in a transducer housing 24. The fiber 16 adjacent exit end 22, and preferably not more than about 5 or 6 fiber diameter lengths from its end face 26, is bent in a manner such that light exiting from the fiber 16 through face 26 will project therefrom in an expanded cone 28 which is assymetric to the axis of the fiber 16. The fiber 16 is positioned in housing 24 so that the cone of light 28 will project from the face 26 onto a reflective surface 30 of a movable or deformable member 32 which may be mounted, for example, on biasing springs 34 and 35 in a manner such that a force applied to the member 32 will cause the member to be displaced relative to the end face 26 and in a plane parallel to the plane of the face 26.

In operation, as the reflective surface 30 moves in response to a force acting on the surface 30 which is sufficient to overcome the biasing force of springs 34 and 35, the area of the surface 30 which will be illuminated by the cone of light 28 will expand or contract as a function of the distance (designated x in the drawing) between fiber face 26 and the reflective surface 30 and the resulting reflected cone of light 36 which will project back toward face 26 of fiber 16 will expand or contract similarly. However, only a small proportion of the light in reflected cone 36 will actually reenter the fiber 16 for transmission back through the fiber 16 to the photodetector and the amount of reflected light that will reenter the fiber 16 in this embodiment will depend mainly on the ratio of the area of the face 26 which will receive the light to the total area of projection of the reflected cone 36 in a plane defined by the face 26. Thus, the sensitivity of the assembly in detecting movement of the reflective surface will depend primarily on the extent of change in the projected area of reflected light as a result of changes in the distance x since the area of face 26 which will couple with the reflected light is constant.

In this regard, it should be noted that a modification in the sensitivity curve of the system is achieved utilizing the assembly of FIG. 2 wherein an expanded cone of light 28 assymetric to the axis of the fiber 16 is projected as compared with prior single fiber assemblies such as those discussed at page 2 hereinabove wherein a normal symmetric cone of light is projected. From my experimentation, I have found that sensitivity of the prior assemblies changes linearly with changes of distance, in accordance with a sensitivity curve which is based on the intensity of reentering light as a function of the distance of the face from the reflective surface, up to a distance of about 50% of the diameter of a fiber having a numerical aperture of about 0.5. At further distances, the sensitivity curve for these prior assemblies is too flat to enable practical discrimination of changing distances of the reflective surface from the fiber face. However, utilizing the assembly of FIG. 2, the sensitivity curve has been modified to an extent that even minor movement of the reflective surface from the fiber face can be detected over a wide range of distances. Accordingly, it has been found that utilizing the assembly of FIG. 2, any movement of the reflective surface away from a given distance will result in a significant change in the intensity of reflected light that will reenter the fiber and, thus, provide a more effective means for sensing movement of the reflective surface.

Turning now to the embodiment of the invention shown in FIG. 3, an optical transducer designated generally by the reference numeral 12 is shown in which the optical fiber 16 is supported and fixed within a transducer housing 24. The fiber 16 terminates in an end face 38 which has been bevelled by any suitable means such as polishing so that a canted surface is formed relative to the axis of the fiber 16. Additionally, this end face 38 may be coated with a reflective material, if desired. The slope of the canted end face 38 is defined by an angle $\alpha$ as shown in FIG. 3. Furthermore, the angle $\alpha$ is complementary to an angle $\beta$ which lies between the axis of the fiber 16 (i.e., the general direction of the light transmitted through the fiber 16) and a vector 40 normal to the canted end face 38. The angle $\beta$ thereby defining the angle of incidence for the light transmitted along the axis. The lower limit of this angle $\beta$ (and, accordingly, the upper limit of angle $\alpha$) is established such that the angle of incidence of light transmitted in a forward direction through fiber 16 impacting the canted end face 38 will equal or exceed the critical angle of reflection so that the light will not pass through the end face 38 but, rather, will reflect off of the face. When the face 38 is coated with a reflective material, the upper limit of angle $\alpha$ will not exceed an angle such that the light transmitted in a forward direction through fiber 16 will reflect off of the mirrored end face in the reverse direction without having been reflected toward the periphery of the fiber for projection onto the movable or deformable reflective surface 30.

Operation of the transducer 12 illustrated in FIG. 3 depends on the light transmitted through the fiber 16 reflecting off of end face 38 and being projected out of fiber 16 in a cone 28 onto the reflective surface 30 of a movable or deformable member 32. As depicted in FIG. 3, the angle $\alpha$ defining the slope of the canted end face 38 equals 45°. Accordingly, angle $\beta$ will likewise equal 45° and the light transmitted through the fiber 16 along the axis will reflect off of end face 38 at an angle normal to the axis. This light will then be projected along this path normal to the axis of the fiber and through the curved surface presented by the circumference of the fiber whereby the projected cone of light will be expanded. As previously described with regard to the embodiment of this invention illustrated in FIG. 2, in view of the cone of light which is projected, the sensitivity of the assembly in detecting movement of the reflective surface will be enhanced as a result of the modification in the sensitivity curve resulting from the projection of the expanded cone of light 28 onto the reflective surface 30. Furthermore, it should be recognized that the sensitivity of transducers constructed in accordance with this embodiment of the invention will be further enhanced in view of the change in the sensitivity curve which will result from the fact that the reflected light 36 reentering the fiber core for transmission back through the fiber 16 also will be reintroduced into the fiber 16 through the curved circumferential surface of the fiber.

In FIG. 4, a detailed enlargement is shown of the light path in a further embodiment of the transducer 12 wherein the angle $\alpha$ defining the slope of the canted end face 38 exceeds 45°. In this embodiment, it can be seen that the light reflected off of end face 38 is projected back through the fiber toward the curved circumferential surface of the fiber and impacts the fiber surface at an angle of incidence which is shown as angle $\theta$. For this reflected light to be refracted out of the fiber core, it is necessary for this angle of incidence $\theta$ (which corresponds to the formula $\theta = 90° - 2\beta$ or $2\alpha - 90°$) to be less than the critical angle of reflection so that the light will not be internally reflected but, rather, will be projected out of the fiber. Furthermore, as the light exits from the denser medium of the fiber 16 into air before impacting the reflective surface 30, the emergent light will be displaced in accordance with the law of refraction (Snell's Law) so that angle $\alpha$ will be greater than angle $\theta$ resulting in a further modulation of the projected cone of light in addition to the modulation caused by the projection of light through the circumferential surface of the fiber.

FIG. 5 is a detailed enlargement of the light path in another embodiment of the transducer 12. In this embodiment, angle $\alpha$ is less than 45° and angle $\theta$ corresponds to the formula $\theta = 2\beta - 90°$ or $90° - 2\alpha$. As in the embodiment of FIG. 4, angle $\theta$ must be less than the critical angle of reflection in order to enable the light to be projected out of the fiber. Also, angle $\gamma$ will exceed angle $\theta$ as discussed hereinabove as a result of the refraction of the light passing from the denser fiber medium to the less dense medium of air whereby further modulation of the projected cone of light is achieved.

Figure 7:
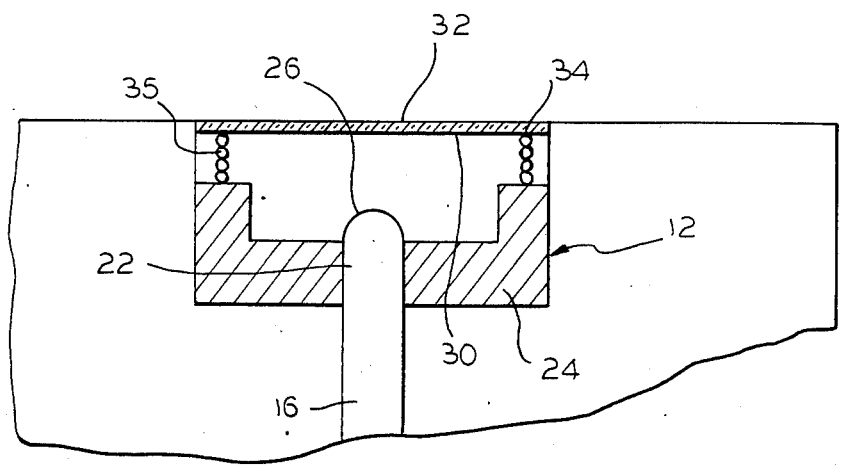
FIG. 7 is a partially schematic diagram of another embodiment of an optical transducer according to the present invention wherein the end face of the fiber is formed in a convex shape.

In the above figures, the representations have been schematic to aid understanding of the invention. It will be appreciated by one skilled in the art that the dimensions being dealt with are extremely small and can only be schematically illustrated. While the invention has been particularly shown and described with reference to preferred embodiments thereof, it will be understood by those skilled in the art that the foregoing and other changes in form and details may be made therein without departing from the spirit and scope of the invention. One such variation might include the choice of configuration of the end face of the fiber in order to alter the shape of the cone of exiting light such as, for example, by forming the end face 26 in a concave shape as illustrated in FIG. 6 or a convex shape as illustrated in FIG. 7. Another contemplated variation would be to alter the position and orientation of the transducer relative to the reflective surface in order to accomplish alternative measurements in the displacement or structure of the reflective surface.

What is claimed is:

1. A fiber optic transducer comprising a single optical fiber and a movable member having a reflective surface thereon, said single optical fiber providing means for transmitting light in a first direction toward a first end of said fiber where the transmitted light is projected out of the fiber as a cone of light which impacts said reflective surface of said movable member and is reflected off of said surface as a modulated cone of light directed toward said first end of said fiber at which a portion of said modulated reflected cone of light reenters the fiber and is transmitted through said fiber in a second direction toward a second end thereof and means in the structure of the fiber for producing said cone of light comprising a bend in the fiber adjacent said first end thereof whereby an expanded cone of light which is assymetric to the axis of the fiber is projected out of the fiber and whereby sensitivity to movement of said reflective surface of said movable member is enhanced.

2. The fiber optic transducer of claim 1 wherein said bend is positioned not more than about 6 fiber diameter lengths from said first end of said fiber.

3. A fiber optic transducer comprising a single optical fiber and a movable member having a reflective surface thereon, said single optical fiber providing means for transmitting light in a first direction toward a first end of said fiber where the transmitted light is projected out of the fiber as a cone of light which impacts said reflective surface of said movable member and is reflected off of said surface as a modulated cone of light directed toward said first end of said fiber at which a portion of said modulated reflected cone of light reenters the fiber and is transmitted through said fiber in a second direction toward a second end thereof and means in the structure of the fiber for producing said cone of light comprising a surface formed on said first end of said fiber which is canted at an angle relative to the axis of said fiber greater than the critical angle of reflection whereby said transmitted light will reflect off of said surface and whereby sensitivity to movement of said reflective surface of said movable member is enhanced.

4. The fiber optic transducer of claim 3 wherein said surface is coated with a reflective material.

5. The fiber optic transducer of claim 3 wherein said surface is canted at an angle relative to the axis of the fiber such that the light reflected off of said surface will impact the circumferential surface of the fiber at an angle of incidence less than the critical angle of reflection whereby said light will be refracted out of the fiber through the circumferential surface and will be projected onto said reflective surface.

6. A fiber optic transducer comprising a single optical fiber and a movable member having a reflective surface thereon, said single optical fiber providing means for transmitting light in a first direction toward a first end of said fiber where the transmitted light is projected out of the fiber as a cone of light which impacts said reflective surface of said movable member and is reflected off of said surface as a modulated cone of light directed toward said first end of said fiber at which a portion of said modulated reflected cone of light reenters the fiber and is transmitted through said fiber in a second direction toward a second end thereof and means in the structure of the fiber for producing said cone of light comprising a concave surface formed on said first end of said fiber whereby sensitivity to movement of said reflective surface of said movable member is enhanced.

7. A fiber optic transducer comprising a single optical fiber and a movable member having a reflective surface thereon, said single optical fiber providing means for transmitting light in a first direction toward a first end of said fiber where the transmitted light is projected out of the fiber as a cone of light which impacts said reflective surface of said movable member and is reflected off of said surface as a modulated cone of light directed toward said first end of said fiber at which a portion of said modulated reflected cone of light reenters the fiber and is transmitted through said fiber in a second direction toward a second end thereof and means in the structure of the fiber for producing said cone of light comprising a convex surface formed on said first end of said fiber whereby sensitivity to movement of said reflective surface of said movable member is enhanced.

* * * * *